United States Patent
Dho et al.

(10) Patent No.: US 6,910,776 B2
(45) Date of Patent: *Jun. 28, 2005

(54) APPARATUS FOR IMAGE PROJECTING HAVING A MATRIX TYPE OF OPTICAL-SWITCH

(75) Inventors: Sang-Whoe Dho, Suwon (KR); Chang-Wan Hong, Suwon (KR)

(73) Assignee: Samsung Electronic's CO., Ltd. (KR)

( * ) Notice: Subject to any disclaimer, the term of this patent is extended or adjusted under 35 U.S.C. 154(b) by 135 days.

This patent is subject to a terminal disclaimer.

(21) Appl. No.: 10/411,330

(22) Filed: Apr. 11, 2003

(65) Prior Publication Data

US 2004/0109141 A1 Jun. 10, 2004

(30) Foreign Application Priority Data

May 2, 2002 (KR) ........................................ 2002-24209

(51) Int. Cl.$^7$ .............................................. G03B 21/00
(52) U.S. Cl. ............................ 353/31; 353/99; 348/742
(58) Field of Search ............................ 353/31, 34, 37, 353/94, 98, 99; 349/5, 7, 8, 9; 348/742, 743, 771, 750, 751, 753, 756, 757, 804

(56) References Cited

U.S. PATENT DOCUMENTS

| | | | |
|---|---|---|---|
| 6,309,072 B1 * | 10/2001 | Deter | 353/31 |
| 6,398,363 B1 * | 6/2002 | Ho et al. | 353/20 |
| 6,419,363 B1 * | 7/2002 | Ho et al. | 353/20 |
| 6,733,135 B2 * | 5/2004 | Dho | 353/31 |
| 6,799,850 B2 * | 10/2004 | Hong et al. | 353/30 |
| 2003/0174255 A1 * | 9/2003 | Lee et al. | 348/744 |

* cited by examiner

Primary Examiner—William C. Dowling
(74) Attorney, Agent, or Firm—Sughrue Mion, PLLC

(57) ABSTRACT

An image projecting apparatus having an optical switch of a non-square matrix structure, is provided. A light source emits a plurality of monochromatic lights having different wavelengths. A first light transmission unit includes of a plurality of optical fibers that allows monochromatic lights to be passed therethrough. An optical switch unit has a plurality of non-square matrix type reflecting mirrors to selectively reflect the monochromatic lights. The reflecting mirrors includes a first group placed at odd lines and a second group placed at even lines. A square-beam generation unit converts reflected monochromatic lights into square beams, and a panel transmits the monochromatic lights converted into square beams and forms monochromatic signals of a predetermined size.

11 Claims, 10 Drawing Sheets

APPARATUS FOR IMAGE PROJECTING HAVING A MATRIX TYPE OF OPTICAL-SWITCH

BACKGROUND OF THE INVENTION

1. Field of the Invention

The present invention relates to an apparatus for image projecting, and more particularly, to an apparatus for image projecting to form a plurality of R, G, B color signals on a panel by using an optical-switch having a non-square matrix type structure.

The present application is based on Korean Patent Application No. 2002-24209 filed on May 2, 2002, which is incorporated herein by reference.

2. Description of the Prior Art

A projector is an apparatus for image projecting that shows an image by projecting an input image signal on a screen. The image projecting apparatus is mainly used for presenting in a meeting room, in a projector in a cinema, and in a home theater.

A method for projecting an image on a screen after magnifying the image shown on a liquid crystal display (LCD) or a cathode ray tube (CRT) with a lens has been conventionally used to realize a big screen. However, this method only magnifies an image but does not provide a clear image. To solve the above problem, an image projecting apparatus applying a DMD (Digital Micro-mirror Device) panel is now used.

DMD is an optical-switch using a micro-mirror. The micro-mirror controls the reflection of light in accordance with an input image signal. Also, the DMD applies a digital method, thus color reproduction of the image signal is good and brightness is high. Moreover, it does not require A/D or D/A conversion, thus images are clearly realized.

FIG. 1 is a view showing a basic structure of a conventional apparatus for image projecting using a color wheel.

Referring to FIG. 1, the apparatus for image projecting using the color wheel has a light source 10, a color wheel 20, a DMD panel 30 and a projecting lens 40. In FIG. 1, an optical passage of white light is shown as one dotted line.

The light source 10 emits white light by using an arc lamp or a laser. The color wheel 20 rotates (shown as the direction of an arrow) by a rotating means (not shown), and it is divided into R(red), G(green) and B(blue) regions.

The white light emitted from the light source 10 is separated as R, G, B beams by the R, G, B region of the color wheel 20. The DMD panel 30 is composed of a plurality of micro-mirrors 30a. The R, G, B beams separated for each wavelength are projected to the DMD panel 30 and reflected at the micro-mirrors 30a. Reflected R, G, B beams penetrate the projecting lens 40 and create an image on a screen.

FIG. 2 is a view showing a basic structure of an apparatus for image projecting having an optical-switch of a 3×3 matrix structure.

The apparatus for image projecting 200 of FIG. 2 has been already invented by the inventor of the present invention that is discussed in this specification, but it has not been disclosed to the public yet.

Referring to FIG. 2, the apparatus for image projecting 200 has a light source 110, a first light transmission unit 120, an optical-switch unit 130, a second light transmission unit 140, square-beam generation units 150, a panel 160 and a projecting lens unit 170. Moreover, the optical passages of R, G, and B laser beams in the optical-switch unit 130 are shown by a one-dotted line, a two-dotted line and a three-dotted line respectively.

The light source 110 emits a plurality of monochromatic lights having different wavelengths from each other, and in this embodiment, R, G, and B laser beams will be used as the monochromatic lights. The light transmission unit 120 has a plurality of first optical fibers 122a, 122b and 122c and a plurality of first collimating lenses 124a, 124b and 124c. The first optical fibers 122a, 122b and 122c allow R, G, and B laser beams to pass therethrough, and the first collimating lenses 124a, 124b and 124c focus the laser beams transmitted through the optical fibers to the optical-switch unit 130.

The optical-switch unit 130 has optical switches 130a to 130i arranged in the 3×3 matrix structure. Each of the optical switches 130a to 130i selectively reflects the focused laser beams to output ports 135a, 135b and 135c.

The laser beams reflected from the optical switches 130a to 130i of the optical-switch unit 130 are incident in second collimating lenses 142a, 142b and 142c through the output ports 135a, 135b and 135c, respectively.

The second light transmission unit 140 has the plurality of second collimating lenses 142a, 142b and 142c and a plurality of second optical fibers 144a, 144b and 144c. The R, G and B laser beams focused to the second optical fibers 144a, 144b and 144c by the second collimating lenses 142a, 142b and 142c are respectively transmitted to light tubes 154a, 154b, and 154c of square-beam generation unit 150.

The square-beam generation unit 150 has a plurality of first lenses 152a, 152b and 152c, a plurality of light tubes 154a, 154b and 154c, and a second lens 156. The light tubes 154a, 154b and 154c convert laser beams split by the first lenses 152a, 152b and 152c into a square beam. The second lens 156 re-splits the converted laser beam.

The panel 160 is a DMD panel. The panel 160 receives the split R, G and B laser beam thereby respectively forming R, G and B color strips at one section among three sections of the panel 160.

The three R, G and B color strips on the panel 160 are formed by the manipulation of the optical-switch unit 130, and one image is created as the same color strip is formed three times at different positions that are upper, middle and lower sections of the panel 160.

The panel 160 digitalizes and time-divides the R, G and B color strips and reflects them at a predetermined angle. The reflected image of the entire panel is projected onto a screen through the projecting lens 170 and the image is realized. The projecting lens 170 is installed facing the panel 160.

The described conventional apparatus for image projecting 100 creates an image by using the color wheel 20, and in this case, the amount of light used in DMD panel 30 is one third of the entire amount. This is because the R beam passed through the R region of the color wheel 20 is evenly projected to the entire DMD panel 30 but G and B beams are blocked by a color filter and not used. It is the same when G and B beams are projected.

The color wheel method can use one third of incident white light, and thus the luminance of the image is lowered to one third. In other words, the entire amount of the light is decreased as the white light emitted from the light source is projected to DMD panel 30 after passing through the color wheel and as a result, light efficiency is lowered as well. Furthermore, the luminance of the created image cannot be maximized.

In addition, the apparatus for image projecting 200 of FIG. 2 already proposed by the inventor of the present invention creates an image by using an optical switch of a 3×3 matrix structure, thus the light efficiency of the apparatus 200 is greater than that of an optical system using a color wheel. However, in the apparatus for image projecting 200, the ends of each color strip formed at an upper, middle and lower layer of the panel 160, are overlapped, and thus the boundary of the color signals are not clear. In this case, an image realized on a screen has an extra line.

SUMMARY OF THE INVENTION

The present invention has been made to overcome the above-mentioned problem of the prior art. Accordingly, it is the object of the present invention to provide an image projecting apparatus capable of improving the utilization of light that is deteriorated to one-third of a signal panel.

Another object of the present invention is to provide an image projecting apparatus using an optical switch of a (3×6) matrix, or a (6×3) matrix structure capable of preventing edge lines of monochromatic strips from being overlapped when a plurality of monochromatic strips are formed on a panel by using an optical switch.

An image projecting apparatus of the present invention has: a light source to emit a plurality of monochromatic lights having different wavelengths; a first light transmission unit comprising a plurality of optical fibers that the monochromatic lights pass through; an optical switch unit comprising a plurality of reflecting mirrors of non-square matrix structure to selectively reflect the monochromatic lights, the reflecting mirrors of non-square matrix structure comprising a first group placed at an odd row and a second group placed at an even row; at least one square-beam generation unit to convert the reflected monochromatic lights to square beams; a panel to form a monochromatic strip with a predetermined size by being transmitted the monochromatic lights converted to square beams; and a projecting lens unit installed opposing to the panel. The first group and the second group of the optical switch unit reflect the monochromatic lights in an alternate order.

More specifically, the reflecting mirrors move between a first position to reflect the monochromatic lights and a second position to allow the monochromatic lights to be passed therethrough. The optical switch unit allows only one reflecting mirror to be placed at the first position at one row and one column.

One screen is created on the panel as the plurality of reflecting mirrors reflect the monochromatic lights at least one time in accordance with a predetermined order. The non-square matrix of the optical switch unit is either a (3×6) matrix or a (6×3) matrix. The reflecting mirrors are MEMS (Micro Electro Mechanical System) mirrors.

Furthermore, the image projecting apparatus further has an output port unit having a plurality of output ports to output the monochromatic lights reflected from the reflecting mirrors of the optical switch unit. The monochromatic light reflected from the first reflecting mirror among the plurality of reflecting mirrors is output to the output port corresponding to the first reflecting mirror.

In addition, the image projecting apparatus further has a second light transmission unit comprised of the plurality of optical fibers to transmit the monochromatic lights emitted from the output ports to the square-beam generation unit. The panel is a DMD (Digital Micromirror Device) that modulates a plurality of monochromatic strips to digital signals and reflects the signals to the projecting lens unit for a predetermined angle.

According to the present invention, as monochromatic strips are formed by using optical switches of a (3×6) matrix, or a (6×3) matrix structure, the overlap of the edge lines of the monochromatic strips can be prevented.

BRIEF DESCRIPTION OF THE DRAWINGS

The above-mentioned object and the feature of the present invention will be more apparent by describing the preferred embodiment of the present invention by referring to the appended drawings, in which.

DESCRIPTION OF THE PREFERRED EMBODIMENT

Hereinbelow, the present invention will be described in greater detail by referring to the appended drawings.

Figure 1:
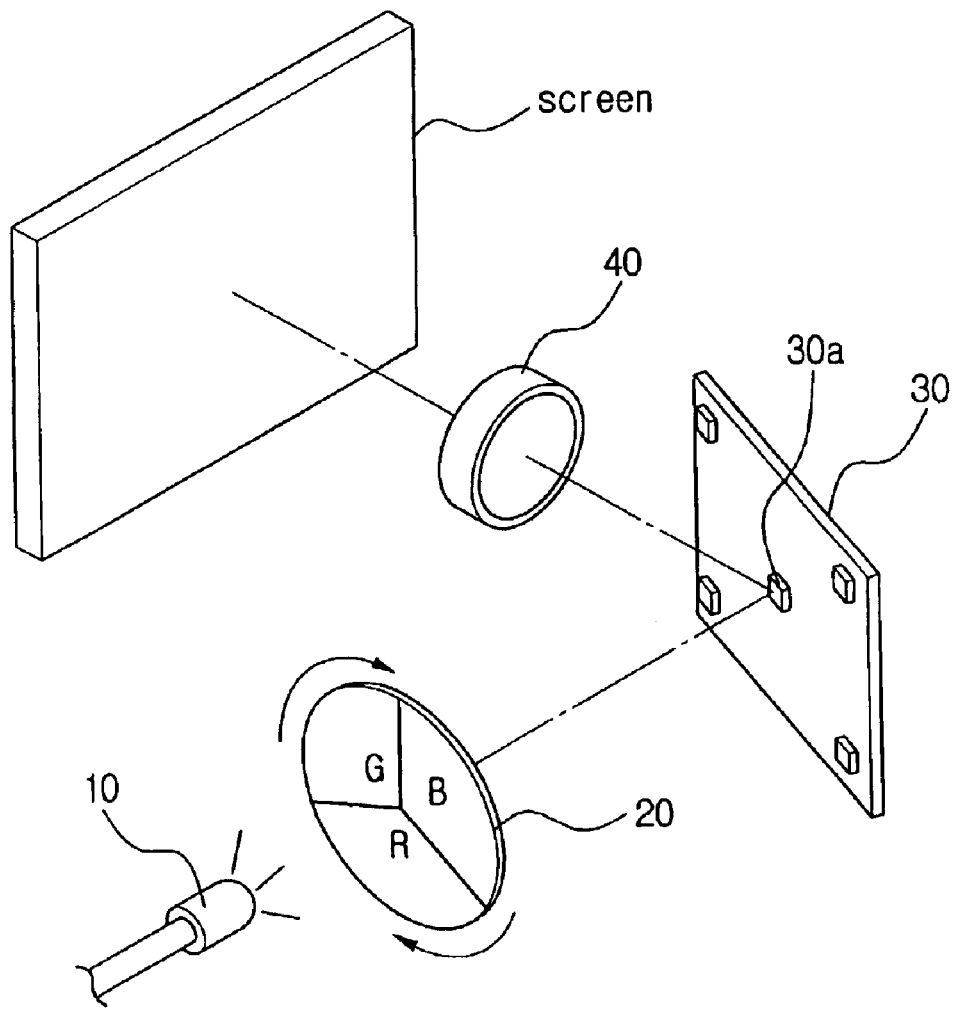
FIG. 1 is a view showing the basic structure of a conventional apparatus for image projecting using a color wheel.
Figure 2:
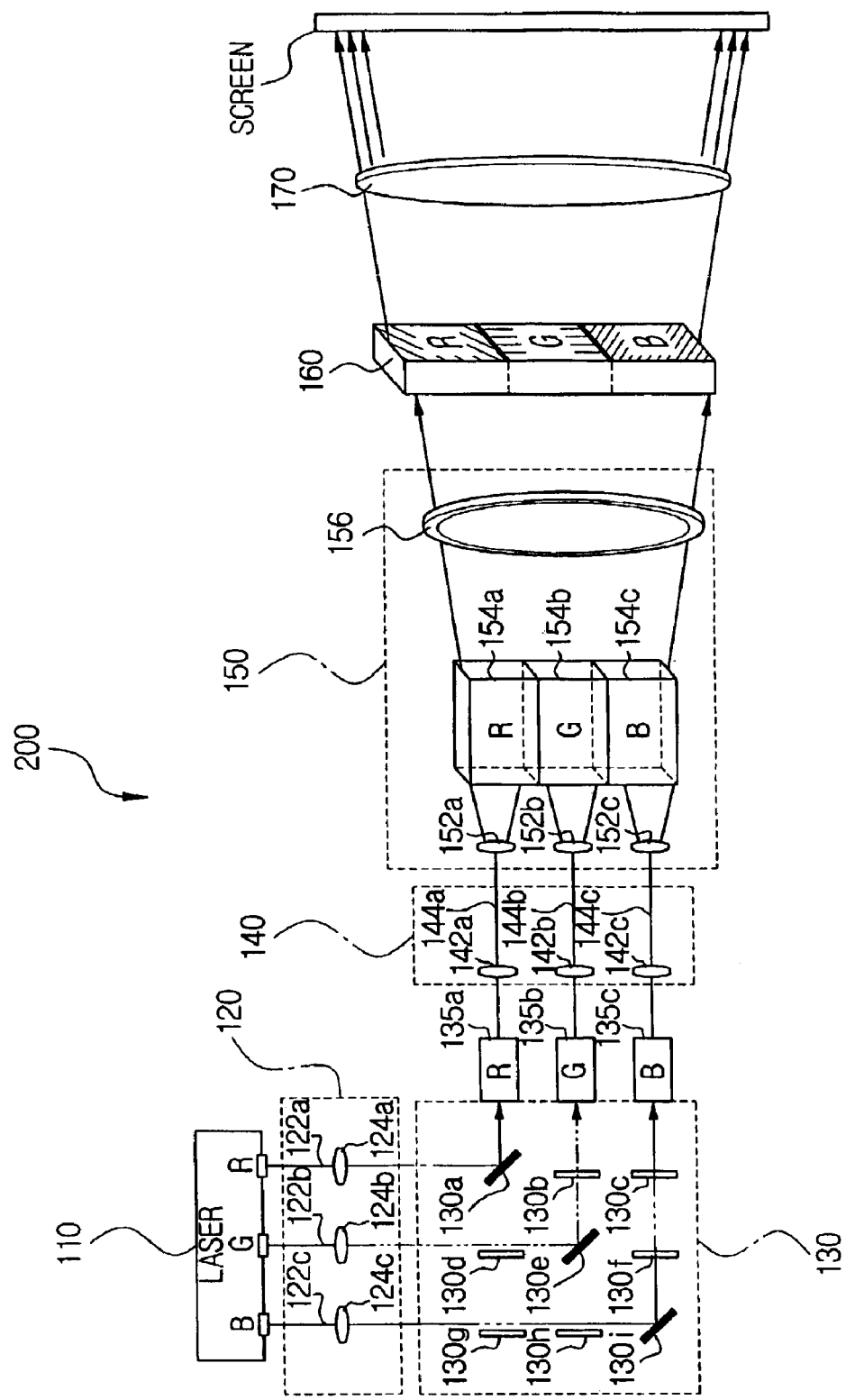
FIG. 2 is a view showing the basic structure of an apparatus for image projecting of a 3×3 matrix structure already proposed by the inventor of the present invention.
Figure 3:
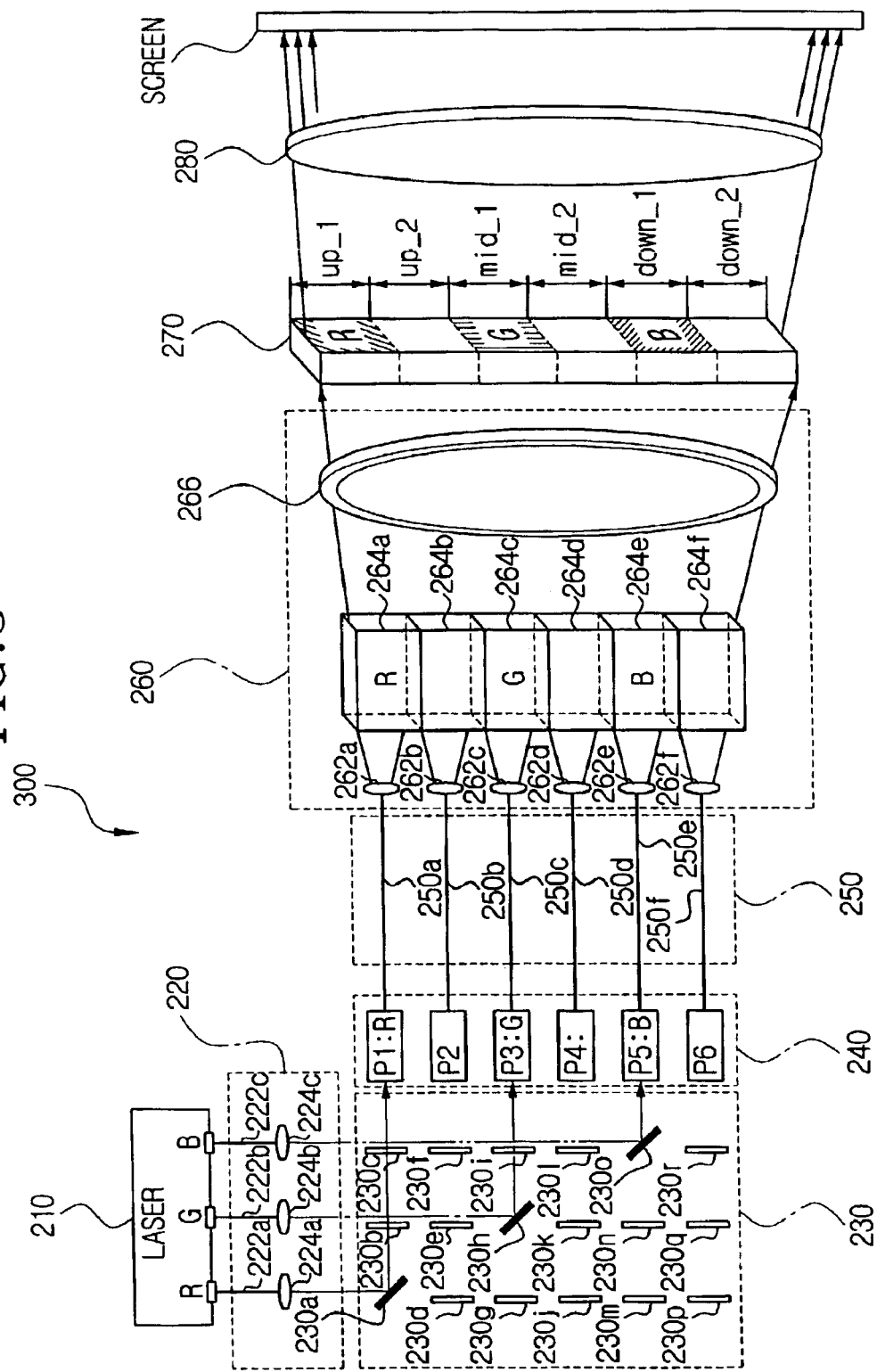
FIG. 3 is a view showing an apparatus for image projecting of a 6×3 matrix structure according to the preferred embodiment of the present invention.

FIG. 3 is a view showing an apparatus for image projecting according to the preferred embodiment of the present invention.

Referring to FIG. 3, the apparatus for image projecting 300 according to the present invention includes a light source 210, a first light transmission unit 220, an optical-switch unit 230, an output port 240, a second light transmission unit 250, a square-beam generation unit 260, a panel 270 and a projecting lens unit 280. In the optical-switch unit 230 of FIG. 3, the light passages of R, G, and B laser beams are indicated as a one-dotted line, a two-dotted line and a three-dotted line, respectively.

The light source 210 emits a plurality of monochromatic light having different wavelengths. Laser, an arc lamp, a metal halide lamp, a halogen lamp and a xenon lamp can be applied for the light source 210. In the present invention, a plurality of monochromatic lights of R, G, and B laser beams will be applied.

The first light transmission unit 220 has a plurality of optical fibers 222a, 222b and 222c and a plurality of first collimating lenses 224a, 224b and 224c. The first optical fibers 222a, 222b and 222c transmit each of the R, G and B laser beams to the first collimating lenses 224a, 224b and 224c. The first collimating lenses 224a, 224b and 224c concentrate the transmitted R, G and B laser beams to the optical-switch unit 230.

The optical-switch unit 230 reflects the R, G and B laser beams at a predetermined angle or permits the R, G and B laser beams to pass therethrough, and has a plurality of optical-switches arranged in a non-square matrix structure. In other words, the plurality of optical switches is arranged in the m×n (n is an integer that is more than 3, m>n) matrix structure or m×n (m is an integer that is more than 3, m<n) matrix structure. In this case, the optical-switch unit 230 has m×n number of the optical switches.

It is preferable that a high-reflection mirror manufactured by applying MEMS (Micro Electro Mechanical System) is used for the optical switches. The optical switches directly output the R, G and B laser beams as they are without converting the input optical signals into electrical signals. Therefore, the speed of switching on or off becomes fast by tens of thousands of times more than conventional switching speed required for converting optical signals into electric signals.

The optical switches have a reflecting mirror and a driving unit. One side of the reflecting mirror is a high reflecting mirror of a MEMS and it reflects a laser beam. The reflecting mirror is moved by the driving unit between the first position (on position) where the R, G, and B laser beams input into the optical switch are reflected to a certain section of the panel and the second position (off position) where the R, G, and B laser beams input into the optical switch travel straight.

In the first position (on), the optical switch is sloped (for example, the position of the optical switch indicated as 230a, 230h and 230o in FIG. 3), reflecting the input laser beam. In the second position (off), the optical switch lies down (for example, the position of the optical switch indicated as 230b to 230g, 230i to 230n and 230p to 230r in FIG. 3).

Referring to FIG. 3 again, the optical switch unit 230 having 18 optical switches 230a to 230r formed in the 6×3 matrix structure will be described. The optical switches 230a to 230r of the optical switch unit 120 are divided into a first group provided at odd number lines (230a, 230b, 230c, 230g, 230h, 230h, 230m, 230n and 230o) and a second group provided at even number lines (230d, 230e, 230f, 230j, 230k, 2301, 230p, 230q and 230r).

The first group and the second group of the optical switch unit 230 alternately reflect monochromatic light. Moreover, the first group (first line, third line and fifth line in (3×3) matrix) of the optical switch unit 230 operates with only one optical switch being placed at the first position (on) for one row and one column. In addition, the first group operates with the three optical switches being placed at the first position simultaneously or all of the (3×3) optical switches being placed at the first position in a predetermined order. This is identically applied to the second group (second line, fourth line and sixth line in a (3×3) matrix).

For example, when R, G, and B laser beams incident in the optical switch unit 230 are reflected by the first group, the second group is placed on the second position (off) for a predetermined time. When the predetermined time is passed, the first group is placed at the second position (off) and R, G, and B laser beams are reflected by the second group. The first group and the second group reflect R, G and B laser beams or allow them to be alternately penetrated at a predetermined temporal interval.

The predetermined temporal interval is the time maintained before the first group turns to the second group or the second group turns to the first group. The temporal interval is the time required for realizing 60 scenes of image per one second. Real temporal interval can differ based on a driving method.

Referring to FIG. 3, reflection of R, G and B laser beams by the first group will be described. When a certain optical switch 230a of the first group is placed at the first position (on), optical switches 230b, 230c, 230g and 230m placed at the same row and column as the certain optical switch 230a are placed at the second position (off). When a certain optical switch 230h is placed at the first position (on), optical switches 230i and 230n placed at the same row and column as the certain optical switch 230h are placed at the second position (off), and the remained optical switch 230o is placed at the first position (on).

In the above case, a R laser beam is reflected at an optical switch indicated as 230a, a G laser beam is reflected at an optical switch indicated as 230h, and a B laser beam is reflected at an optical switch indicated as 230o. When the above process is completed, the second group reflects laser beams in the same manner.

Furthermore, one image is created as a (6×3) number of optical switches (230a to 230r) are placed at the first position (on) at least one time. That is, three optical switches at different rows and columns in one group are placed at the first position (on) after three optical switches at different rows and columns in a predetermined group are placed at the first position (on) is operated three times. In the above process, the same optical switch is not placed at the first position (on).

Laser beams reflected at the optical switches 230a to 230r of the optical switch unit 230 are transmitted to the second light transmission unit 250 by the output port unit 240.

The output port unit 240 has a plurality of output ports P1, P2, P3, P4, P5 and P6. The output ports P1 to P6 are installed at an output end of the optical switch unit 230 in order to be respective aligned with each row of the optical switch unit 230.

The second light transmission unit 250 has a plurality of second optical fibers 250a to 250f. In addition, a plurality of second collimating lenses (not shown) can be provided at front ends of the second optical fibers 250a to 250f. The second optical fibers 250a to 250f transmit R, G and B laser beams concentrated by the second collimating lenses (not shown) to the square-beam generation unit 260.

The square-beam generation unit 260 is provided at output ends of the second optical fibers 250a to 250f, and it converts transmitted R, G and B laser beams into square beams having a predetermined ratio of width to height. The square-beam generation unit 260 has a plurality of first lenses 262a to 262f, a plurality of light tubes 264a to 264f and a second lens 266.

The first lenses 262a to 262f disperse each laser beam in order to allow the laser beams to be incident into the light tubes 264a to 264f corresponding to the first lenses 262a to 262f.

The light tubes 264a to 264f are formed to have a cubic shape and the inside of the tubes is hollowed. The four inner sides of the light tubes 264a to 264f are made of mirror. The laser beams incident into the inside of the hollowed light tubes 264a to 264f from the first lenses 262a to 262f are converted into square beams.

The second lens 266 disperses the laser beams converted into the square beams and allows the dispersed laser beams to be incident into the panel 270. The panel 270 is composed of one DMD (Digital Micro Mirror) panel or one LCD (Liquid Crystal Display) panel. DMD panel is a reflective panel and LCD panel is a penetrable panel. When a LCD panel is used, the position of a projecting lens and a screen can be changed.

Hereinbelow, the present invention will be described by using DMD panel. Yet, FIG. 3 shows a DMD panel excluding the optical passage of laser beams reflected at the DMD panel.

The panel 270 is a DMD panel of a single plate. R, G and B laser beams converted into square beams are formed as R, G and B monochromatic strips at one end of the panel 270. The R strip is indicated by slant lines, the G strip by vertical lines, and B strips by inversed slant lines.

Furthermore, the panel 270 can be temporally divided into an upper end 1 (up_1), upper end 2 (up_2), middle end 1 (mid_1), middle end 2 (mid_2), down end 1 (down_1) and down end 2 (down_2). When the optical switch unit 230 is operated as shown in FIG. 3, an R beam is reflected at a predetermined optical switch 230a, a G beam is reflected at a predetermined optical switch 230h, and a B beam is reflected at a predetermined optical switch 230o.

In the above case, the R beam is projected to the upper end 1 (up_1) of the panel 270 after passing through the first output port P1, second optical fiber 250a, first lens 262a, light tube 264a and second lens 266. The G beam is projected to the middle end 1 (mid_1) and the B beam is projected to the down end 1 (down_1) of the panel 270.

The panel 270 has numerous fine driving mirrors. The driving mirrors divide each R, G and B strip over time after modulating R, G and B strips formed at the panel 270 into a digital type, and reflect them at a predetermined angle. An image is created as the image of the entire panel reflected from the driving mirrors of the panel 270 is projected to a screen through the projecting lens unit 280. The projecting lens unit 280 is installed facing the panel 270.

Figure 4:
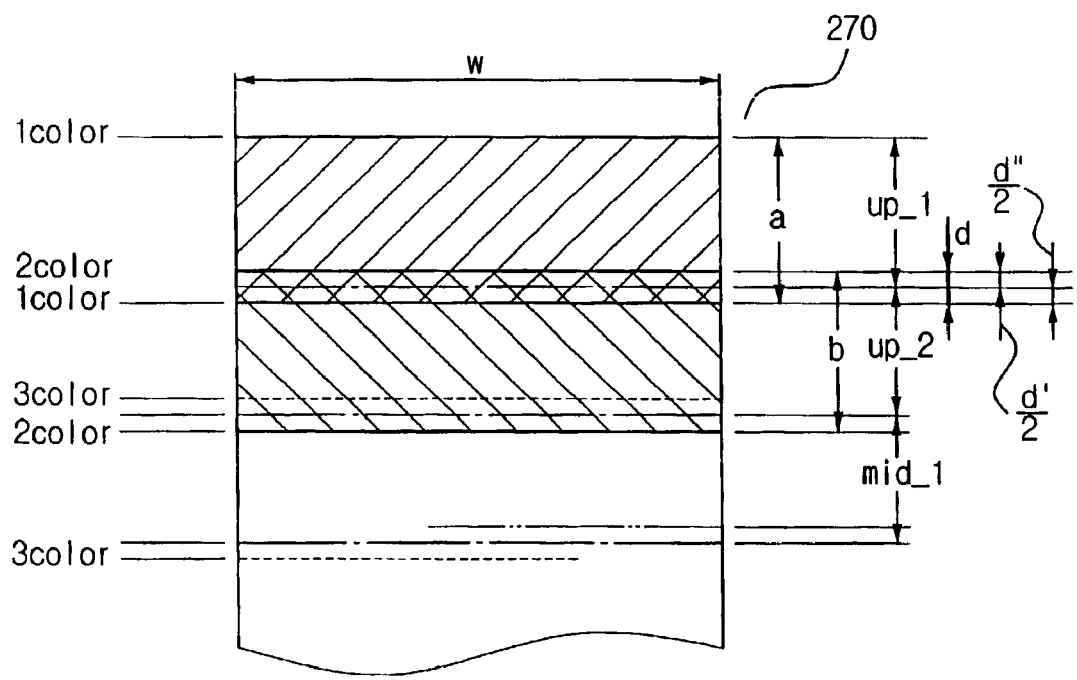
FIG. 4 is a view for explaining color strips formed on a DMD panel by a 6×3 optical-switch unit applied to FIG. 2.

FIG. 4 is a view showing single strips formed at a DMD panel by a (6×3) optical switch unit.

In FIG. 4, the upper end 1 (up_1), upper end 2 (up_2) and middle end 1 (mid_1) of the panel 270 are shown. A first monochromatic strip (1 color) with respect to the laser beam reflected at the first line of the optical switch unit 230 is indicated as slant lines at the upper end 1 (up_1). A second monochromatic strip (2 color) with respect to the laser beam reflected at the second line of the optical switch unit 230 is indicated as reversed slant lines at the upper end 2 (up_2).

The part where the slant lines and the reversed slant lines are overlapped is to show the part where the edge area of the first monochromatic strip (color) and the second monochromatic strip (2color) are overlapped. The first monochromatic strip (1color) is formed first and the second monochromatic strip (2color) is formed at the lower end of the first monochromatic strip (1color) to be overlapped for the distance of d.

However, monochromatic strips formed at the panel 270 are not overlapped due to the driving mirrors of the panel 270. Explaining more specifically, even when laser beams are incident to form the first monochromatic strip (1color) as much as the area of w×a (w is the width of the panel 270 and a is the height of the first monochromatic strip (1color) input into the panel 270), the driving mirrors installed at the area of w×d"/2 (d"/2 is the half distance of overlapped area of d) of the panel 270 is driven not to form the first monochromatic strip (1color) at the area of w×d"/2. In other words, the first monochromatic strip (1color) is formed only at the upper end 1 (up_1) as the driving mirror is driven not to reflect laser beams incident into the area of w×d"/2 of the panel 270.

The above method of forming the monochromatic strip is applied to the second monochromatic strip (2color) in the same manner. The second monochromatic strip (2color) is formed only at the upper end 2 (up_2). Therefore, the monochromatic strips can be formed in the way that the edge lines of the monochromatic strips are not overlapped due to the above driving manner of the optical switch unit 230 and the panel 270.

Figure 5A:
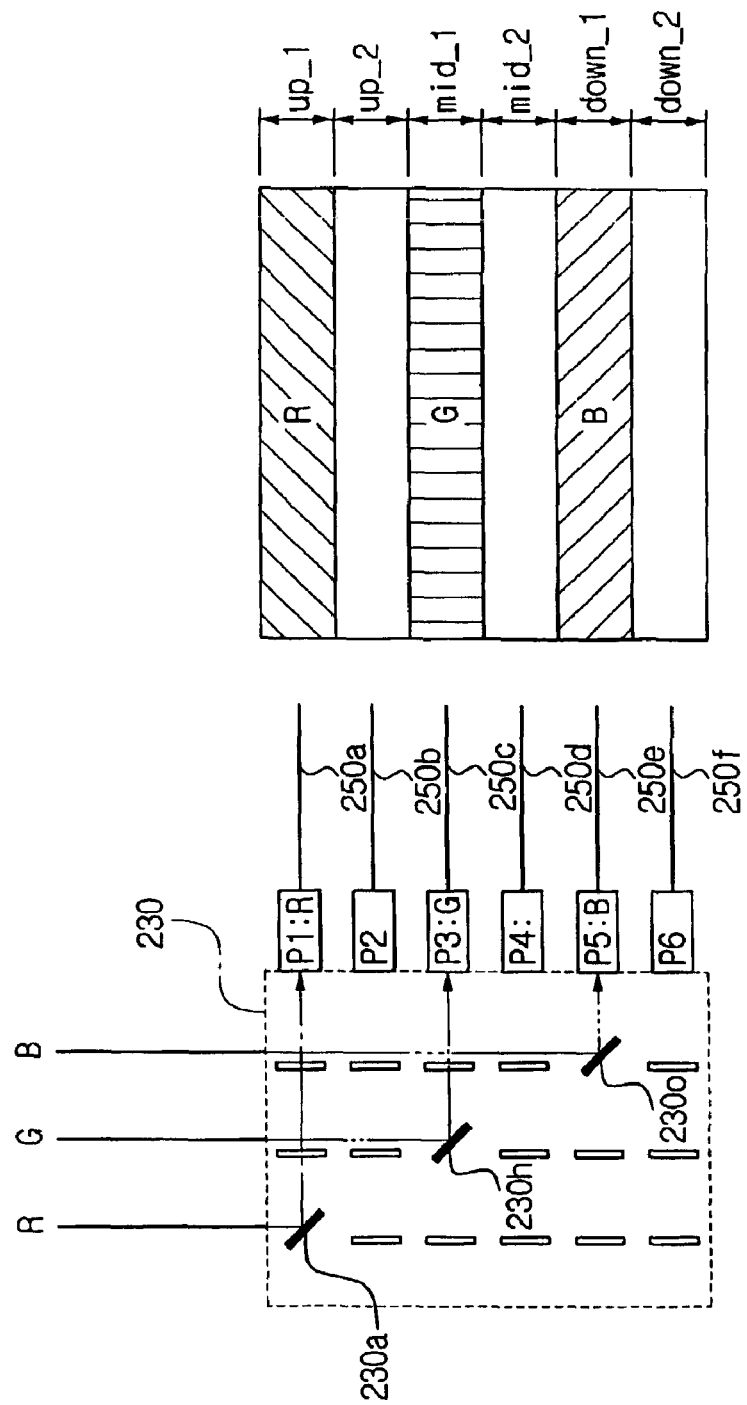
FIGS. 5A to 5F are views showing the process that a screen is realized in accordance with the manipulation of an optical-switch unit according to the preferred embodiment of the present invention.
Figure 5B:
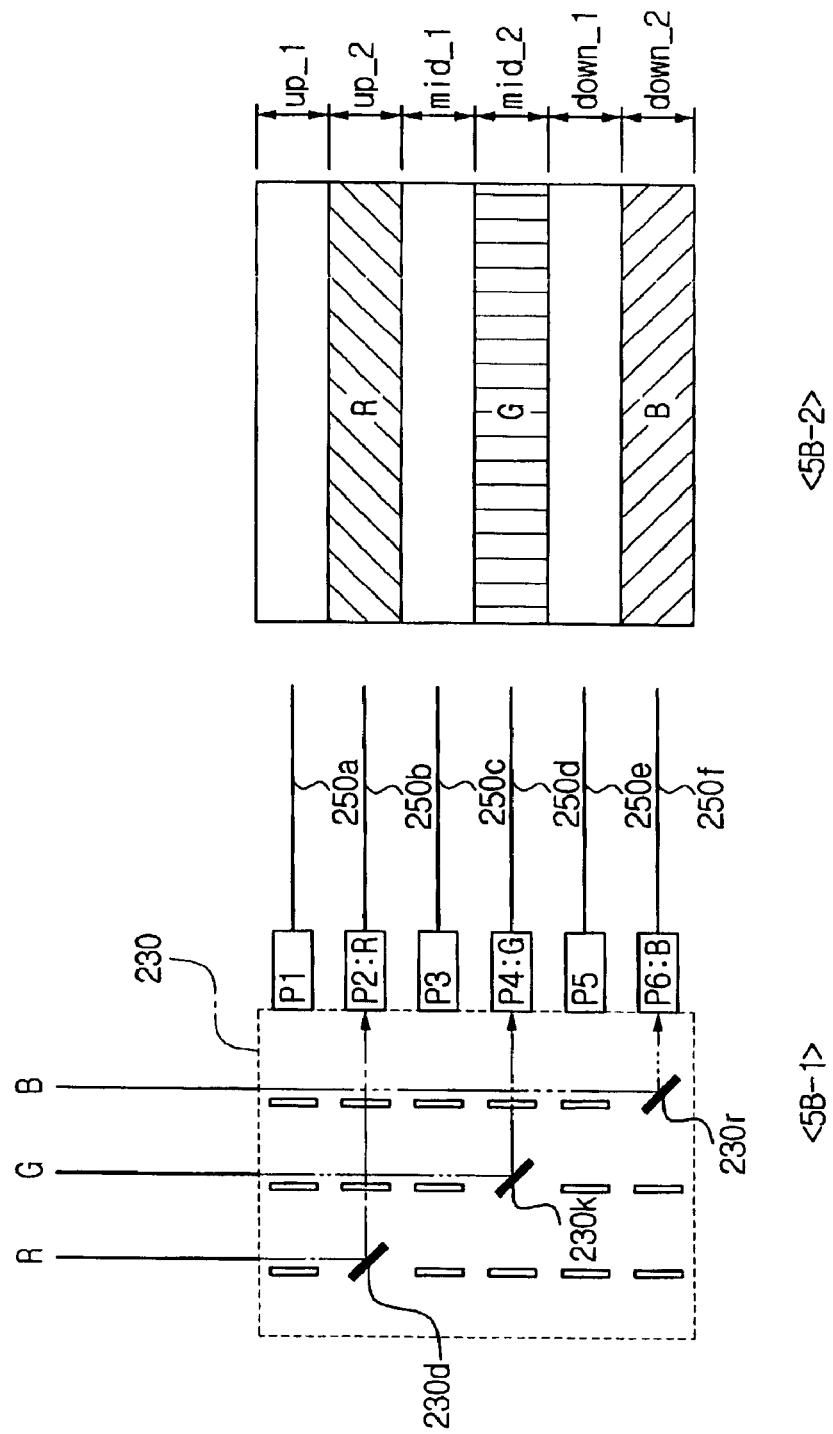
Figure 5C:
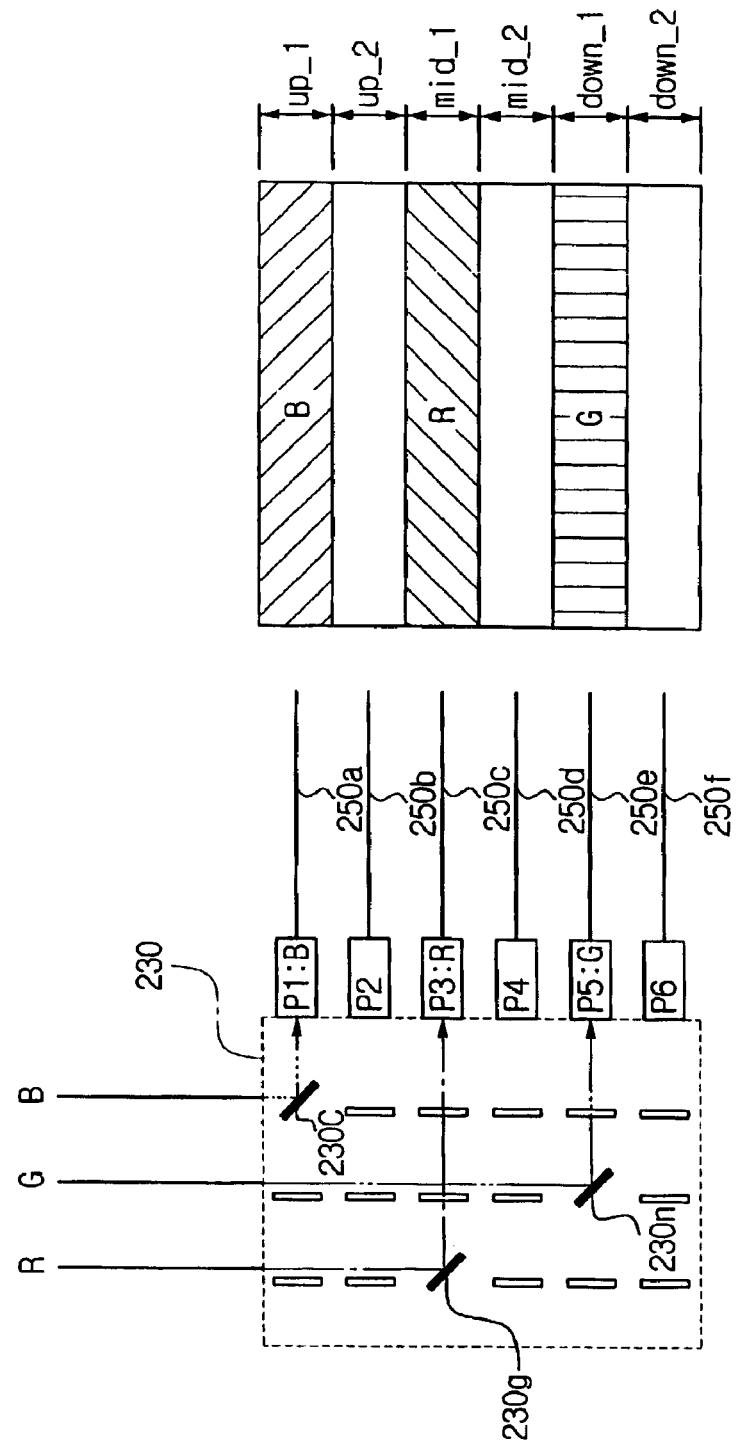
Figure 5D:
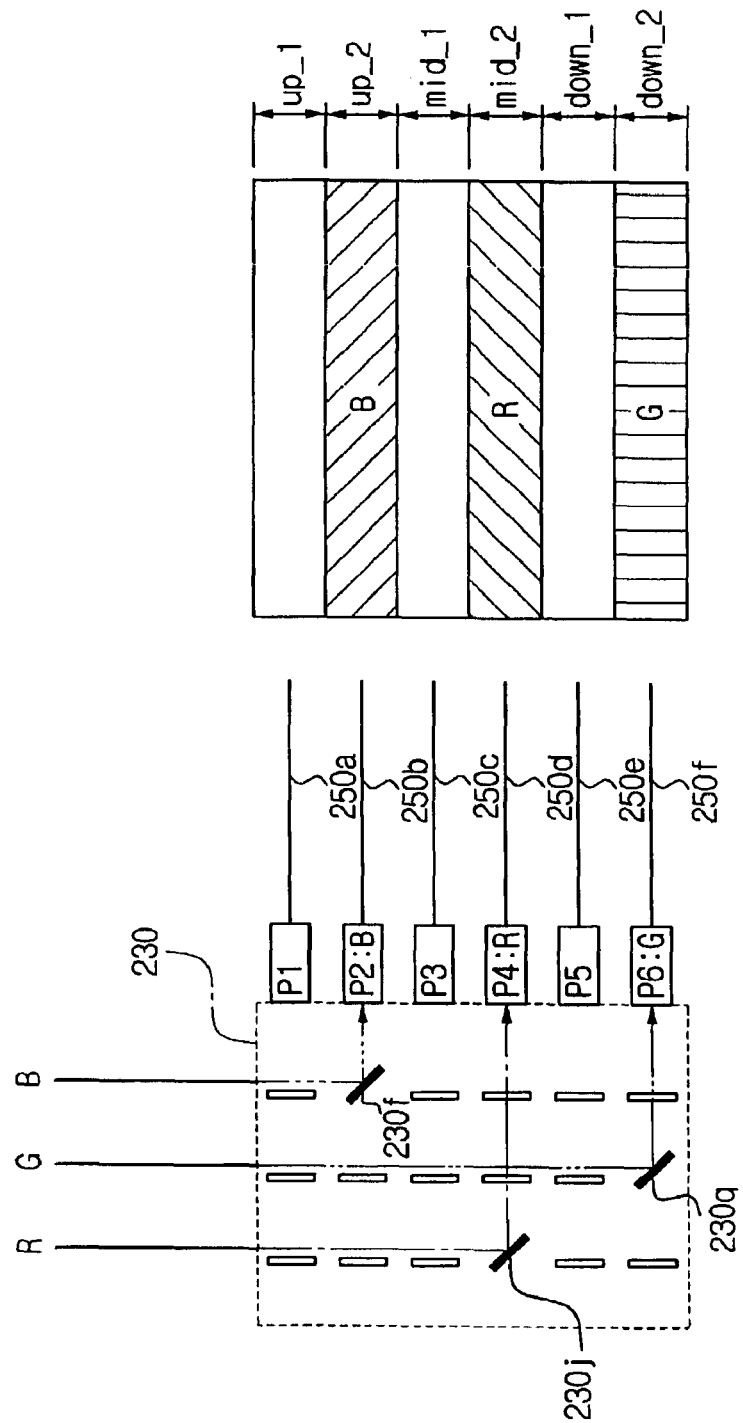
Figure 5E:
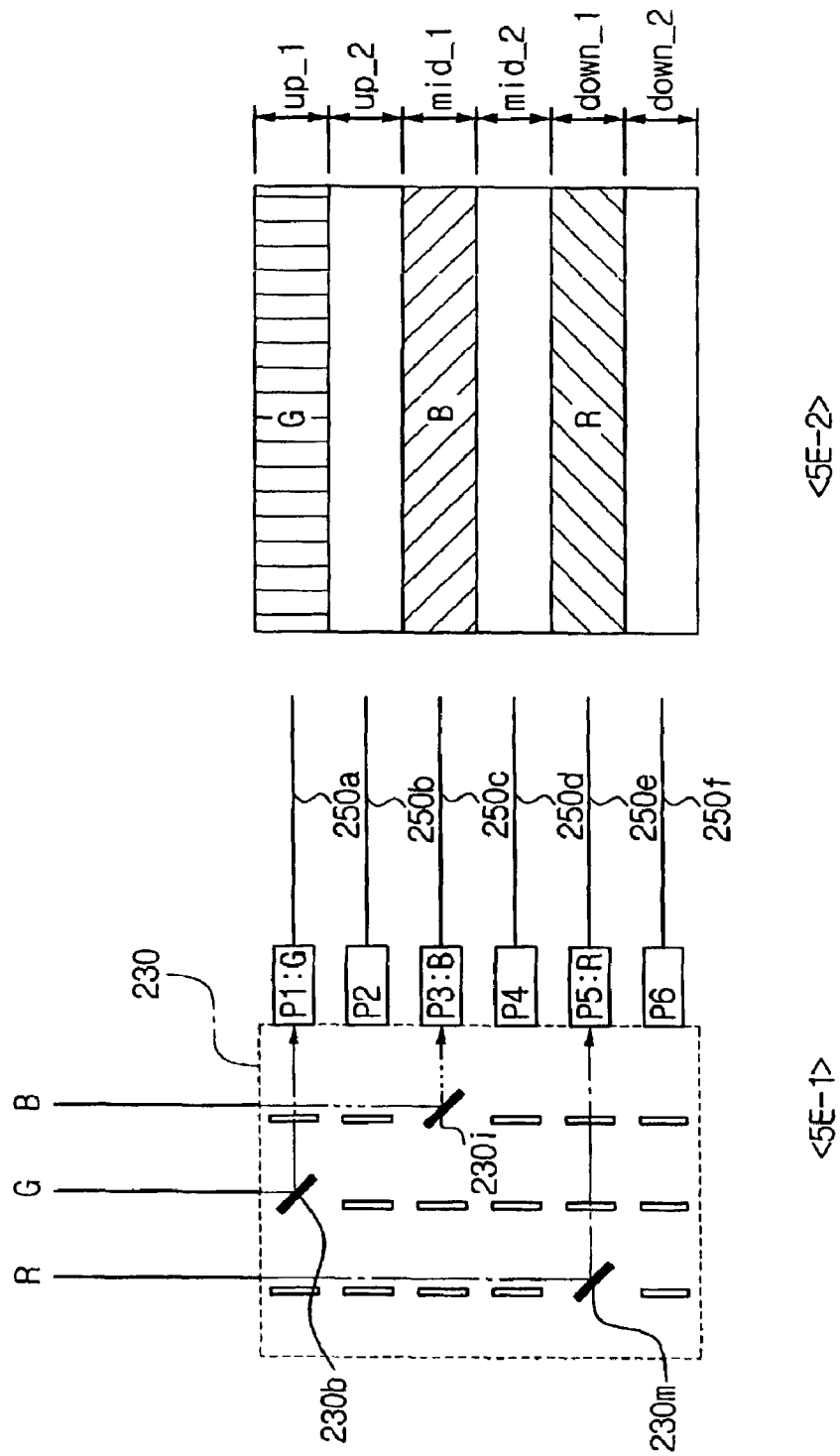
Figure 5F:
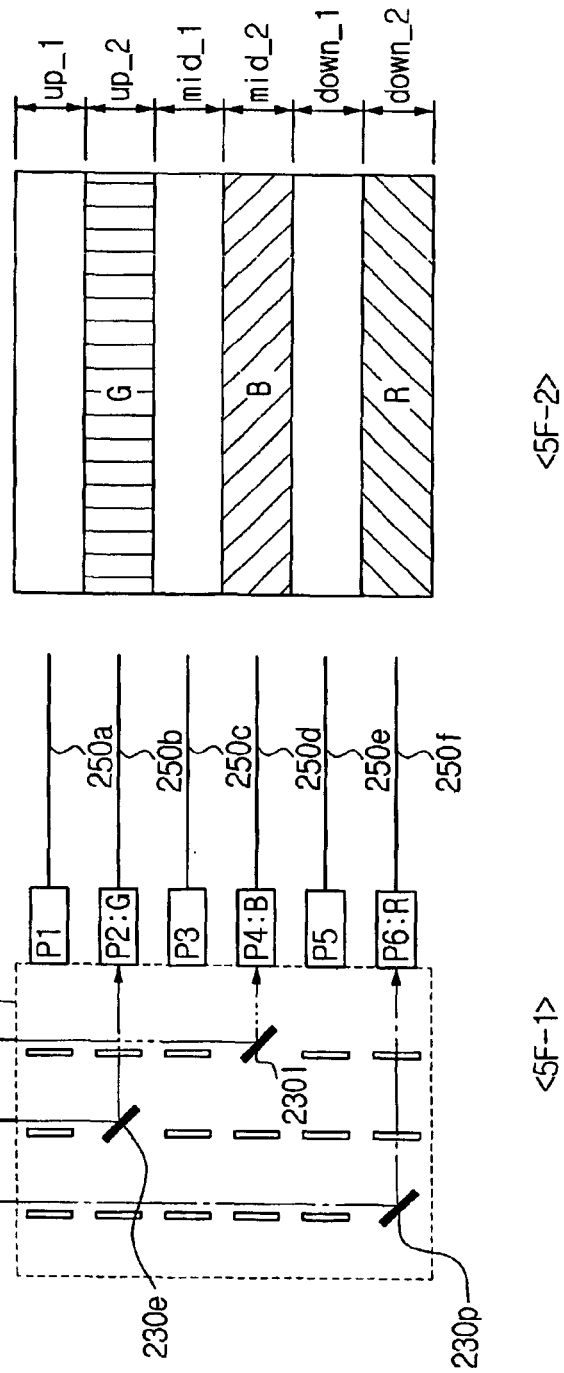

FIGS. 5A to 5F are views showing the preferred embodiment of an image created based on the operation order of the optical switch unit according to the present invention. One screen is realized by applying the processes from FIGS. 5A to 5F. These processes can be changed. FIGS. 5A, 5C and 5E show the operation of the optical switch placed at the first group, and FIGS. 5B, 5D and 5F show the operation of the optical switch placed at the second group.

Referring to FIGS. 5A to 5F, R, G and B laser beams transmitted through the first light transmission unit 220 are reflected at one of the optical switches 230a, 230g and 230m placed at the first column, one of the optical switches 230b, 230h and 230n placed at the second column, and one of the optical switches 230c, 230i and 230o placed at the third column of the first group. In the above case, only one optical switch reflects a monochromatic laser beam at the first position (on) for the same row and column.

Furthermore, the laser beam reflected at one optical switch of the optical switches 230a to 230c placed at the first line of the first group forms a monochromatic strip at the upper end 1 (up_1) of the panel 270 through the first output port P1. The laser beam reflected at one optical switch of the optical switches 230g to 230i of the third line of the first group forms a monochromatic strip at the middle end 1 (mid_1) of the panel 270 through the third output port P3. The laser beam reflected at one optical switch of the optical switches 230m to 230o of the fifth lines of the first group forms a monochromatic strip at the down end 1 (down_1) of the panel 270 through the fifth output port P5.

When the optical switch unit 230 is realized as Table 1, the monochromatic strips formed at the panel 270 are shown in 5A-2 of FIG. 5A.

TABLE 1

|  | Port 1 | Port 2 | Port 3 | Port 4 | Port 5 | Port 6 |
| --- | --- | --- | --- | --- | --- | --- |
| RED | 230a: ON | 230d: OFF | 230g: OFF | 230j: OFF | 230m: OFF | 230p: OFF |
| GREEN | 230b: OFF | 230e: OFF | 230h: ON | 230k: OFF | 230n: OFF | 230q: OFF |
| BLUE | 230c: OFF | 230f: OFF | 230i: OFF | 230l: OFF | 230o: ON | 230r: OFF |

In Table 1, RED means R beam, GREEN means G beam, BLUE means B beam, Port 1 to Port 6 mean a plurality output ports, ON means the first position where the laser beam is reflected, OFF means the second position where the laser beam passes through, and 230a to 230r mean optical switches.

When the optical switches 230a to 230r of the optical switch unit 230 are driven for only the first group as shown in 5A-1 in FIG. 5A, a monochromatic strip like 5A-2 of FIG. 5A is formed at the panel 270. P1:R of 5A-1 means that R beam is input from the optical switch 230a into the first output port P1. P3:G means that G beam is input from the optical switch 230h into the third output port P3. Lastly, P5:B means that B beam is input from the optical switch 230o into the fifth output port P5.

Additionally, when the optical switch unit 230 is driven as shown in Table 2, the single strips formed at the panel 270 are as shown in 5B-2 of FIG. 5B.

TABLE 2

|  | Port 1 | Port 2 | Port 3 | Port 4 | Port 5 | Port 6 |
|---|---|---|---|---|---|---|
| RED | 230a: OFF | 230d: ON | 230g: OFF | 230j: OFF | 230m: OFF | 230p: OFF |
| GREEN | 230b: OFF | 230e: OFF | 230h: OFF | 230k: ON | 230n: OFF | 230q: OFF |
| BLUE | 230c: OFF | 230f: OFF | 230i: OFF | 230l: OFF | 230o: OFF | 230r: ON |

When the optical switches 230a to 230r of the optical switch unit 230 are driven as shown in Table 2, that is, when only the second group is driven like in 5B-1 of FIG. 5B, monochromatic strips as shown in 5B-2 are formed at the panel 270.

Moreover, when the optical switch unit 230 is driven as shown in Table 3, the monochromatic strips formed at the panel 270 are as shown in 5C-2 of FIG. 5C.

TABLE 3

|  | Port 1 | Port 2 | Port 3 | Port 4 | Port 5 | Port 6 |
|---|---|---|---|---|---|---|
| RED | 230a: OFF | 230d: OFF | 230g: ON | 230j: OFF | 230m: OFF | 230p: OFF |
| GREEN | 230b: OFF | 230e: OFF | 230h: OFF | 230k: OFF | 230n: ON | 230q: OFF |
| BLUE | 230c: ON | 230f: OFF | 230i: OFF | 230l: OFF | 230o: OFF | 230r: OFF |

When the optical switches 230a to 230o of the optical switch unit 230 are driven as shown in Table 3, that is, when only the first group is driven as shown in 5C-1 of FIG. 5, monochromatic strips as shown in 5C-2 are formed at the panel 270.

In addition, when the optical switch unit 230 is driven as shown in Table 4, monochromatic strips formed at the panel 270 are as shown in 5D-2 of FIG. 5D.

TABLE 4

|  | Port 1 | Port 2 | Port 3 | Port 4 | Port 5 | Port 6 |
|---|---|---|---|---|---|---|
| RED | 230a: OFF | 230d: OFF | 230g: OFF | 230j: ON | 230m: OFF | 230p: OFF |
| GREEN | 230b: OFF | 230e: OFF | 230h: OFF | 230k: OFF | 230n: OFF | 230q: ON |
| BLUE | 230c: OFF | 230f: ON | 230i: OFF | 230l: OFF | 230o: OFF | 230r: OFF |

When the optical switches 230a to 230r of the optical switch unit 230 are driven as shown in Table 4, that is, when only the second group is driven as shown in 5D-1 of FIG. 5D, monochromatic strips as shown in 5D-2 are formed at the panel 270.

Furthermore, when the optical switch unit 230 is driven as shown in Table 5, monochromatic strips formed at the panel 270 are as that which is shown in 5E-2 of FIG. 5E.

TABLE 5

|  | Port 1 | Port 2 | Port 3 | Port 4 | Port 5 | Port 6 |
|---|---|---|---|---|---|---|
| RED | 230a: OFF | 230d: OFF | 230g: OFF | 230j: OFF | 230m: ON | 230p: OFF |
| GREEN | 230b: ON | 230e: OFF | 230h: OFF | 230k: OFF | 230n: OFF | 230q: OFF |
| BLUE | 230c: OFF | 230f: OFF | 230i: ON | 230l: OFF | 230o: OFF | 230r: OFF |

When the optical switches 230a to 230r of the optical switch unit 230 are driven as shown in Table 5, that is, when only the first group is driven as shown in 5E-1 of FIG. 5E, monochromatic strips as shown in 5E-2 are formed at the panel 270.

Moreover, when the optical switch unit 230 is driven as shown in Table 6, monochromatic strips are formed at the panel 270 as shown in 5F-2 of FIG. 5F.

TABLE 6

|  | Port 1 | Port 2 | Port 3 | Port 4 | Port 5 | Port 6 |
|---|---|---|---|---|---|---|
| RED | 230a: OFF | 230d: OFF | 230g: OFF | 230j: OFF | 230m: OFF | 230p: ON |
| GREEN | 230b: OFF | 230e: ON | 230h: OFF | 230k: OFF | 230n: OFF | 230q: OFF |
| BLUE | 230c: OFF | 230f: OFF | 230i: OFF | 230l: ON | 230o: OFF | 230r: OFF |

When the optical switches 230a to 230r of the optical switch unit 230 are driven like shown in Table 6, that is, when only the second group is driven like 5F-1 of FIG. 5F, monochromatic strips as shown in 5F-2 are formed at the panel 270.

As described so far, an image is realized by performing the processes of FIGS. 5A to 5F in a predetermined order. Yet, the first group and the second group can be operated in an alternate order. Moreover, anamolphic lenses can be used as the square-beam generation unit 260 instead of the light tubes 264a to 264f used in the present invention. The anamolphic lenses have different curvatures for the length and the width and realize bar-typed beams of color strips on a panel.

According to the present invention, as optical switches of a (3×6) or a (6×3) matrix structure are applied, the edges of monochromatic strips formed on a panel are not overlapped. Especially, the optical switches are operated in an alternate order for a predetermined time interval, thus the overlap of the edge lines of the monochromatic strips does not occur. Furthermore, since the monochromatic strips are formed in consecutive order on the panel by using the MEMS method, the efficiency of light utilization on the panel can be increased. Accordingly, as the amount of the light and the utilization of the light increase, the luminance of a realized image can be improved.

Although the preferred embodiment of the present invention has been described, it will be understood by those skilled in the art that the present invention should not be limited to the described preferred embodiment, but various exchanges and modifications can be made within the spirit and the scope of the present invention. Accordingly, the scope of the present invention is not limited within the described range, but are defined by the following claims.

What is claimed is:

1. An image projecting apparatus comprising:
    a light source to emit a plurality of monochromatic lights of different wavelengths;
    a light transmission unit comprising a first plurality of optical fibers that said plurality of monochromatic lights respectively pass through;
    an optical switch unit comprising a plurality of reflecting mirrors having a matrix structure to selectively reflect said plurality of monochromatic lights, said plurality of reflecting mirrors having the matrix structure comprising a first group placed at an odd row and a second group placed an even row;
    at least one square-beam generation unit to convert the reflected said plurality of monochromatic lights to respective square beam;
    a panel to form a plurality of monochromatic strips of a predetermined size based on an input of said square beam-converted plurality of monochromatic lights; and
    a projecting lens unit installed facing the panel,
    wherein the first group and the second group of the optical switch unit reflect said plurality of monochromatic lights in an alternate order.

2. The apparatus of claim 1, wherein the matrix structure is a non-square matrix structure.

3. The image projecting apparatus of claim 1, wherein the plurality of reflecting mirrors move between a first position to reflect the plurality of monochromatic lights and a second position to allow the plurality of monochromatic lights to be passed therethrough.

4. The image projecting apparatus of claim 3, wherein the optical switch unit allows only one of the plurality of reflecting mirrors located in a particular row and column of the matrix structure, to be placed at the first position.

5. The image projecting apparatus of claim 1, wherein at least one image is produced on the panel as said plurality of reflecting mirrors respectively reflect said plurality of monochromatic lights at least one time, in accordance with a predetermined order.

6. The image projecting apparatus of claim 2, wherein the non-square matrix of the optical switch unit is one of a (3×6) matrix and (6×3) matrix.

7. The image projecting apparatus of claim 1, wherein the plurality of reflecting mirrors are MEMS (Micro Electro Mechanical System) mirrors.

8. The image projecting apparatus of claim 1, further comprising an output port unit having a plurality of output ports to output said plurality of monochromatic lights reflected from the plurality of reflecting mirrors of the optical switch unit.

9. The image projecting apparatus of claim 8, wherein one of said plurality of monochromatic lights reflected from a first one of the plurality of reflecting mirrors is output to one of the plurality of output ports corresponding to a first one of the plurality of reflecting mirrors.

10. The image projecting apparatus of claim 8, further comprising a second light transmission unit comprised of a second plurality of optical fibers to transmit said plurality of monochromatic lights emitted from said plurality of output ports to said at least one square-beam generation unit.

11. The image projecting apparatus of claim 1, wherein the panel is a DMD (Digital Micromirror Device) that modulates the plurality of monochromatic strips to digital signals and reflects the digital signals to the projecting lens unit at a predetermined angle.

* * * * *